United States Patent [19]
Dudley

[11] Patent Number: 5,036,676
[45] Date of Patent: Aug. 6, 1991

[54] METHOD OF COMPRESSOR CURRENT CONTROL FOR VARIABLE SPEED HEAT PUMPS

[75] Inventor: Kevin F. Dudley, Cazenovia, N.Y.

[73] Assignee: Carrier Corporation, Syracuse, N.Y.

[21] Appl. No.: 586,188

[22] Filed: Sep. 21, 1990

[51] Int. Cl.$^5$ ............................................. F25B 1/00
[52] U.S. Cl. .................................... 62/115; 62/180; 62/230; 62/186; 62/228.4
[58] Field of Search ................ 62/115, 160, 180, 181, 62/230, 238.7, 186, 228.4

[56] References Cited
U.S. PATENT DOCUMENTS

| | | | |
|---|---|---|---|
| 3,276,220 | 10/1966 | Miner | 62/230 X |
| 3,514,967 | 6/1970 | Vander Molen | 62/181 X |
| 3,901,308 | 8/1975 | Berger | 62/230 X |
| 4,167,966 | 9/1979 | Freeman | 62/180 X |
| 4,228,846 | 10/1980 | Smorol | 62/160 X |
| 4,949,547 | 8/1990 | Shimizu | 62/238.7 X |

Primary Examiner—William E. Tapolcai

[57] ABSTRACT

A method of controlling compressor current in an air conditioning system having a variable speed compressor which has a predetermined current limit. The actual compressor speed is sensed and compared to a requested predetermined compressor speed. Corrective steps are taken to reduce compressor load if the sensed compressor speed falls below a requested predetermined compressor speed.

5 Claims, 1 Drawing Sheet

METHOD OF COMPRESSOR CURRENT CONTROL FOR VARIABLE SPEED HEAT PUMPS

BACKGROUND OF THE INVENTION

1. Field of the Invention

This invention relates to air conditioning systems, heat pump systems, and, integrated heat pump systems that provide water heating. The invention is more particularly directed to a compressor current control for such systems which have a variable speed compressor.

2. Description of the Prior Art

Integrated heat pumps are often employed to provide heating or cooling, as needed, to a residential or commercial comfort zone, i.e., the interior of a residence, office complex, hospital or the like. Integrated heat pumps are also employed to heat water. A heat pump for air conditioning, comfort zone heating, and water heating is described in U.S. Pat. No. 4,766,734 entitled Heat Pump Systems with Hot Water Defrost to Kevin F. Dudley. Systems of this type typically have several modes of operations, such as air conditioning alone, comfort zone space heating alone, air conditioning with water heating, and comfort zone space heating with water heating.

Such systems are now commonly equipped with variable speed compressors in which the speed of the motor driving the compressor may be varied by speed command signals from a controller, which, in turn, is responding to sensed ambient and system conditions. In general, the motor speed is increased for operation under high load conditions and decreased for operation under low load conditions.

It has been found that when the load on the variable speed compressor is increased at a given operating speed, the current to the compressor increases until the current limit of the variable speed drive is reached. Once the current limit of the variable speed drive is reached, however, if the load upon the compressor is increased further, the speed of the compressor will decrease due to the current being limited. This situation will eventually lead to shut down of the compressor as the speed drops to zero.

SUMMARY OF THE INVENTION

An object of the present invention is to control compressor current in a variable speed system to prevent shut down of the compressor due to the current limit being exceeded.

It is another object of the present invention to sense the compressor speed of a variable speed compressor and to compare the sensed compressor speed to a requested predetermined compressor speed and to take corrective action to reduce compressor load if the sensed compressor speed falls below the requested predetermined speed.

These and other objects of the present invention are achieved in an embodiment applied to a heat pump system by requesting a predetermined compressor speed related to a desired comfort zone parameter, sensing the actual compressor speed, and, increasing indoor fan speed if the sensed compressor speed falls below the requested predetermined speed. If, after increasing indoor fan speed to a maximum the sensed compressor speed is still below the requested predetermined speed the outdoor fan is deactivated. The outdoor fan is then alternately activated and deactivated in response to the outdoor coil temperature, in order to prevent the compressor suction pressure from dropping below the low pressure limit.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of the preferred embodiments when read in connection with the accompanying drawing wherein;

the drawing figure is a diagrammatic representation of an integrated heat pump and hot water system having a variable speed compressor drive that embodies the principals of the present invention.

DESCRIPTION OF THE PREFERRED EMBODIMENT

Figure 1:
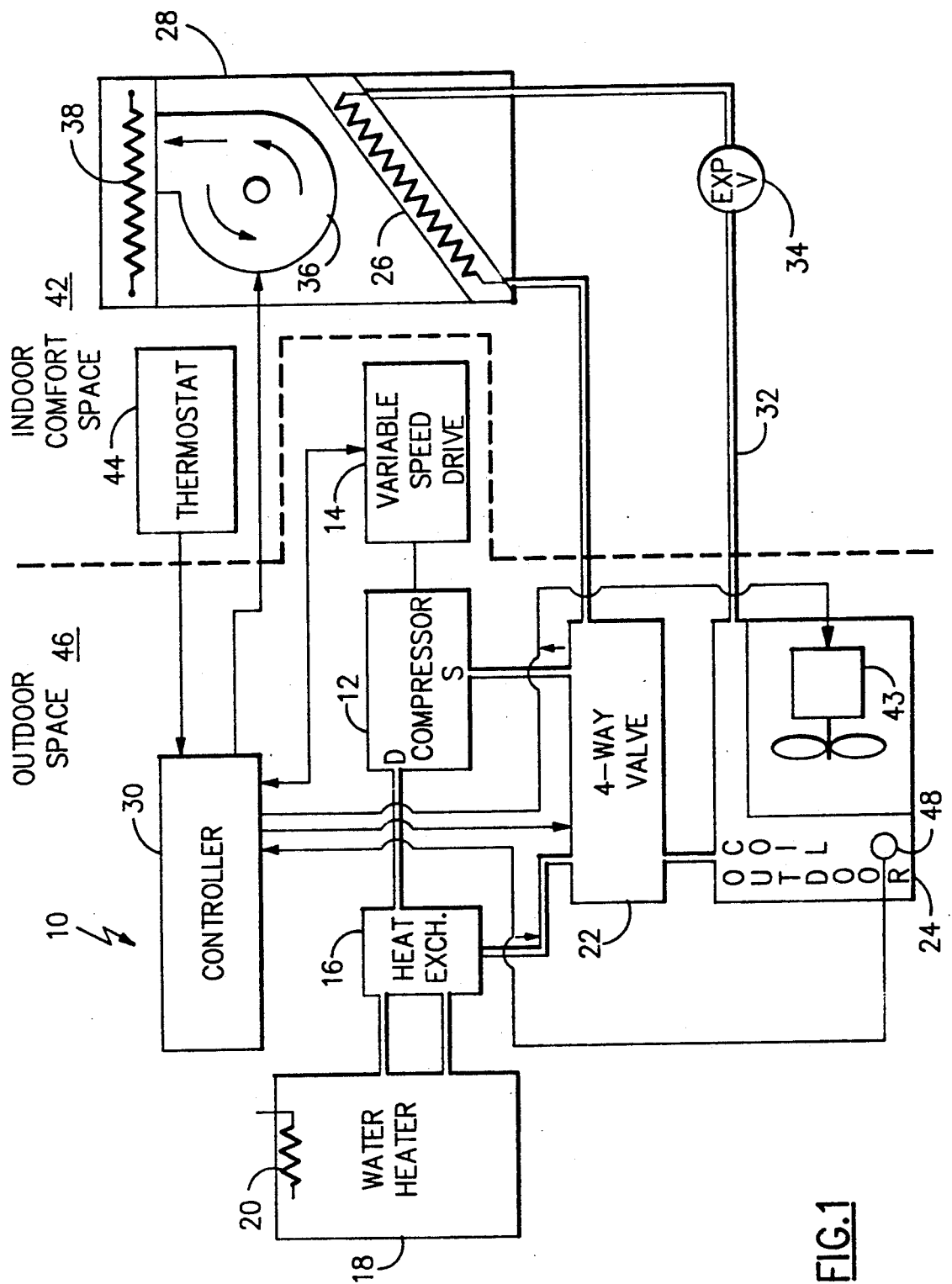

Referring to the drawing figure reference number 10 is applied to an integrated heat pump and hot water system which provides air conditioning and heating to an indoor comfort zone, and also provides hot water. In this system a compressor 12 is driven by a variable speed drive 14 which includes an electric motor of the variable speed type. The compressor 12 will hereinafter be referred as a variable speed compressor and it will be understood from the above that the variable speed is achieved by the appropriate variable speed drive signals delivered to the variable speed drive by a controller 30 which will be described hereinbelow.

The variable speed compressor 12 receives low pressure refrigerant gas at a suction inlet S and discharges the refrigerant gas at high pressure from a discharge port D. The compressed refrigerant flows to a water heat exchanger 16 for heating water in a hot water tank 18. The tank has an auxiliary resistive heater 20 which operates when necessary to supplement the heat provided by the heat pump system.

From the heat exchanger 16 the compressed refrigerant gas flows to a four way valve 22 that is coupled through suitable piping to an outdoor heat exchanger coil 24, and to an indoor heat exchanger coil 26 that is enclosed within an indoor heat exchanger 28. The coils 24 and 26 are also coupled to one another by piping 32 in which is located an expansion valve 34 of a suitable design. Also located within the indoor heat exchanger 28 is a variable speed fan 36, an auxiliary resistance heating element 38 on the discharge side of the fan 36. The indoor heat exchanger 28 is located within an indoor comfort space 42, ie.a home or office, and a thermostat 44 is also disposed within the indoor comfort space 42. The outdoor coil 24 is located in an outdoor space 46 and has an outdoor coil temperature sensor 48 located adjacent thereto. An outdoor fan 43 moves outdoor air over the outdoor coil 24.

The controller 30 is formed of a microprocessor having a memory storage capability and which is microprogrammable to control the variable speed drive 14, the variable speed fan 36, the outdoor fan 43 and the four way valve 22. The controller also has inputs connected to the outdoor coil temperature sensor 48, and the thermostat 44.

The four way valve 22 can assume heating or cooling configurations by establishing the sequence in which the compressed vapor flows through the two coils 24 and 26. For heating, the compressed refrigerant gas flows first to the indoor coil 26, which serves as a condenser. Condensed refrigerant liquid then flows through the piping 32 through the expansion valve 34 and into the outdoor coil 24 which serves as an evaporator. Low pressure gas then returns through the four way valve 22 to the suction inlet S of the compressor 12.

For cooling of the comfort space 42, the four way valve 22 is set to direct the compressed refrigerant gas from the compressor to the outdoor coil 24, which serves as a condenser, and then through the piping 32 and the expansion valve 34 to the indoor coil 26 now serving as an evaporator. The low pressure refrigerant gas from the indoor coil 26 is then returned to the four way valve 22 and thence to the suction inlet S of the compressor 12. The water heat exchanger 16 is operative in either the heating or cooling mode to heat the water in the tank 18.

To summarize the operation of the controller as described above, the controller receives inputs from the thermostat 44, the variable speed compressor drive 14 and the outdoor air temperature sensor 48. The programmable microprocessor in the controller utilizes these inputs and controls the variable speed compressor drive 14, the outdoor fan 43, and the indoor fan 36.

In all modes of operation the controller 30 determines the existence of a compressor overcurrent condition by comparing the actual sensed compressor speed to the compressor speed requested by the controller. The controller 30 receives an actual compressor speed signal from the variable speed drive 14. The actual compressor speed is compared to the requested compressor speed, in the controller, and, if the actual compressor speed drops below the speed requested by the controller by a predetermined amount, then an overcurrent condition is said to exist.

When the controller 30 detects an overcurrent condition, the controller is programmed to take positive steps to reduce the load on the compressor and hence bring the compressor current back down to an acceptable operating level. The action taken by the controller depends upon the operating mode of the integrated system 10 when the overcurrent condition is sensed.

When the system is operating in the cooling mode and the controller determines that the actual compressor speed has fallen below the requested predetermined speed by a predetermined amount the controller 30 is programmed to reduce the indoor fan 36 speed in order to lower the suction pressure of the compressor 12 which results in a decreased suction gas density and thus, a decreased load on the compressor. As a result of this action, the compressor current should fall accordingly. The controller is programmed to decrease the indoor fan speed in a linear manner, as the compressor speed decreases, in order to be sure that the desired decrease in load on the compressor takes place.

When operating in the heating mode, and the comparison of requested and actual speeds indicates an overcurrent condition the controller is programmed to ramp the indoor fan 36 to maximum speed to thereby decrease the compressor discharge pressure and the compressor torque requirement. If the overcurrent condition persists, following ramping of the indoor fan to maximum speed, the outdoor fan 43 is cycled off as a second corrective step. The shutting off of the outdoor fan lowers the compressor suction pressure, and the compressor current, as described above in connection with the cooling mode of operation.

In order to prevent suction pressure from dropping below the low pressure limit (thus resulting in complete shutoff of the compressor by the low pressure limit safety device) the outdoor fan 43 is cycled on and off at a predetermined outdoor coil temperature. Accordingly, if the outdoor fan has been shut off in the heating mode and the outdoor coil temperature sensor 48 indicates that the outdoor coil temperature has dropped below a predetermined minimum, the controller 30 will turn the outdoor fan 43 back on until the outdoor coil temperature sensor 48 indicates the temperature has risen to a predetermined amount above the minimum. Activation and deactivation of the outdoor fan 43 may continue alternately in such a fashion until the overcurrent condition no longer exists.

When the integrated heat pump system 10 is operating in a mode where it is cooling, and, providing hot water the corrective measures for the cooling only mode of operation will apply to correct the overcurrent condition. Likewise, when the integrated system is operating in a heating mode, and is providing heated water the corrective measures for the heating mode of operation will apply.

If the integrated system is operating in only the water heating mode, i.e. it is not heating or cooling the comfort zone and an overcurrent condition is detected, the controller 30 is programmed to turn off the outdoor fan 43 if the system 10 is heating water using the outdoor air as a heat source. This action reduces the suction pressure of the compressor and accordingly reduces the compressor current.

Accordingly, it should be appreciated, that a method of operating an air conditioning/heat pump/integrated heat pump system has been provided wherein a variable speed compressor having a predetermined current limit may be controlled to prevent exceeding the predetermined current limit by actions designed to reduce the load on the compressor.

This invention may be practiced or embodied in still other ways without departing from the spirit or essential character thereof. The preferred embodiment described herein is therefore illustrative and not restrictive. The scope of the invention being indicated by the appended claims and all variations which come within the meaning of the claims are intended to be embraced therein.

What is claimed is:

1. In an air conditioning system for cooling a comfort zone having a variable speed indoor fan, and a variable speed compressor having a predetermined current limit, a method of controlling compressor current to prevent exceeding the predetermined current limit, comprising the steps of;

requesting a predetermined compressor speed related to a desired comfort space temperature;
    sensing compressor speed;
    reducing indoor fan speed if the sensed compressor speed falls below said requested predetermined speed by a predetermined amount.

2. In a heat pump system for heating or cooling a comfort space having a variable speed indoor fan, an outdoor, indoor and outdoor coils, and a variable speed compressor having a predetermined current limit, a method of controlling compressor current to prevent exceeding the predetermined current limit, during heating operation, comprising the steps of;

requesting a predetermined compressor speed related to a desired comfort space temperature;

sensing compressor speed; and
increasing indoor fan speed if the sensed compressor speed falls below said requested predetermined speed.

3. The method according to claim 2 further including;
sensing compressor speed again, after the indoor fan speed has been increased to a maximum;
deactivating the outdoor fan if the sensed compressor speed is still below said requested predetermined speed.

4. The method according to claim 3 further including;
sensing the outdoor coil temperature;
reactivating the outdoor fan when the sensed outdoor coil temperature drops below a predetermined minimum;
continuing to sense the outdoor coil temperature; and
alternately; activating the outdoor fan when the sensed outdoor coil temperature rises a predetermined amount above said predetermined minimum; and de activating the outdoor fan when the sensed outdoor coil temperature drops below said predetermined minimum.

5. A method of operating an integrated heat pump and hot water system that is capable of providing heating or cooling to an environmental comfort space, said heat pump and hot water system including an indoor fan, an outdoor, an indoor coil, an outdoor coil, and a variable speed compressor having a predetermined current limit, the method of controlling compressor current to prevent exceeding the predetermined current limit when the system is heating water using outdoor air as a heat source comprising the steps of;
requesting a predetermined compressor speed relating to a desired comfort space temperature;
sensing compressor speed; and
deactivating the outdoor fan if the sensed compressor speed falls below said requested predetermined speed.

* * * * *